United States Patent
Fukushima et al.

(10) Patent No.: US 6,637,983 B2
(45) Date of Patent: Oct. 28, 2003

(54) GAS TRANSPORTATION METHOD FOR GRAIN

(75) Inventors: Yukio Fukushima, Chiyoda-ku (JP); Masaaki Miyamoto, Chiyoda-ku (JP); Seiki Mitomo, Chiyoda-ku (JP); Tatsunori Saigusa, Chiyoda-ku (JP); Shoken Takahashi, Matudo (JP)

(73) Assignee: Hitachi Plant Engineering & Construction Co., Ltd., Tokyo (JP)

( * ) Notice: Subject to any disclaimer, the term of this patent is extended or adjusted under 35 U.S.C. 154(b) by 91 days.

(21) Appl. No.: 10/043,187

(22) Filed: Jan. 14, 2002

(65) Prior Publication Data
US 2003/0133761 A1 Jul. 17, 2003

(51) Int. Cl.$^7$ .............................................. B65G 53/00
(52) U.S. Cl. ....................................... 406/197; 406/198
(58) Field of Search .................................. 406/197, 198

(56) References Cited

U.S. PATENT DOCUMENTS 5,542,612 A * 8/1996 Beisel ............................ 241/5
5,598,770 A * 2/1997 Campbell et al. ............. 99/487

FOREIGN PATENT DOCUMENTS

| JP | 52-20582 | 2/1977 |
| JP | A 2-56255 | 2/1990 |
| JP | A 7-330151 | 12/1995 |

\* cited by examiner

*Primary Examiner*—Joseph A. Dillon
(74) *Attorney, Agent, or Firm*—Oliff & Berridge, PLC (57) ABSTRACT

It is an object of the present invention to provide a method for reducing crushing of grain when the grain having Vickers hardness Hv in a range of $11 \leq Hv \leq 14$ is transported by means of gas. The present invention is a gas transportation method for grain having Vickers hardness Hv in a range of $11 \leq Hv \leq 14$, and gas transportation is performed under the condition that a velocity V of transportation gas is set at a value in a range of 10 m/s$\leq V \leq$20 m/s. Alternatively or additionally, a blending ratio $\mu$ expressed as a ratio of a flow amount of the grain (kg/H) to a flow amount of the transportation gas (kg/H) is set at a value in a range of $(3V-30) \leq \mu \leq (3V-20)$.

12 Claims, 6 Drawing Sheets

GAS TRANSPORTATION METHOD FOR GRAIN

BACKGROUND OF THE INVENTION

1. Field of the Invention

The present invention relates to a gas transportation method for grain, and more particularly to a method for transporting grain with low hardness such as rice by means of gas.

2. Description of Related Art

Conventionally, in rice polishing factories and boiled rice factories, delivered unpolished rice is usually polished by a rice polishing machine to be half-polished rice, and the half-polished rice is processed to be polished rice with its rice bran removed. This polished rice is stored, wrapped to be shipped after being blended with various kinds of polished rice, or is used immediately for boiled rice. In various transportation processes of transporting rice from an unpolished rice storage tank to the rice polishing machine, from the rice polishing machine to a rice bran removing machine, from the rice bran removing machine to a polished rice storage tank, from the polished rice storage tank to a blended rice accommodation tank, and so on, a number of transportation apparatus such as bucket conveyers, lifts, horizontal belt conveyers, and the like are usually used.

However, these transportation apparatus tend to become upsized as factories become large, which has resulted in difficulty in assembly, installation, and maintenance thereof. Furthermore, since rice bran remains in gap parts in these transportation apparatus, microbes such as mold may possibly grow to gather insects and so on eating the mold. This has brought about a problem that values of rice and boiled rice as products may possibly be lost. Since the transportation apparatus need to be frequently disassembled for cleaning in order to eliminate the problem, a problem has been further caused that maintenance cost is increased.

To solve these problems, apparatus for pneumatically transporting rice through pipes are known as are disclosed in Japanese Patent Laid-open No. Hei 7-330151, Japanese Patent Laid-open No. Hei 2-56255, and Japanese Patent Laid-open No. Sho 52-20582. In these apparatus, grain such as rice is transported by air streams which are generated in pipes with the use of blowers and compressors. The use of such a pneumatic transportation method makes it possible to avoid the problem that the rice bran remains halfway in the pipes since the rice and the air are transported in the pipes which are shielded from the outside.

However, in the conventional pneumatic transportation method, problems have often occurred that transported rice is crushed or each grain of rice cracks to reduce the value of the rice as a product. Since consumers demand high quality, particularly for rice to be used for boiled rice, sufficient quality control is required. However, it has been very difficult to transport rice pneumatically without causing any crush or crack to the rice.

The present invention is made in view of the conventional problems as described above and it is an object of the present invention to provide a gas transportation method and apparatus which are capable of preventing transported grain such as rice from crushing or cracking.

SUMMARY OF THE INVENTION

Transportation methods by means of gas such as air are generally divided into a high-pressure transportation method in which the pressure of supplied air is set at a value equal to 200 kPa (kilopascal) or more and a low-pressure transportation method in which the pressure of the supplied air is suppressed at a low value. In the high-pressure transportation method, pressurizing air flows through transportation pipes at a high speed when transportation is finished so that substances moving though the pipes may possibly collide with inner wall surfaces of the pipes to be crushed. Hardness of grain such as rice is generally in a lower range of $11 \leq Hv \leq 14$ in terms of Vickers hardness Hv and since the occurrence of crush and crack of grain during transportation affect its quality, the low-pressure transportation method in which the pressure of the supplied air is suppressed at a low value is appropriate for pneumatic transportation of grain. However, when grain is transported through pneumatic transportation pipes in which transportation passages are long and curved, pressure loss is caused. Therefore, making allowance for this pressure loss, air pressure of a supplying source is generally set at approximately 50 kPa. Transportation of grain through the pipes under this pressure causes the possibility that the grain may be damaged, and therefore, a countermeasure for this problem is required.

Figure 1:
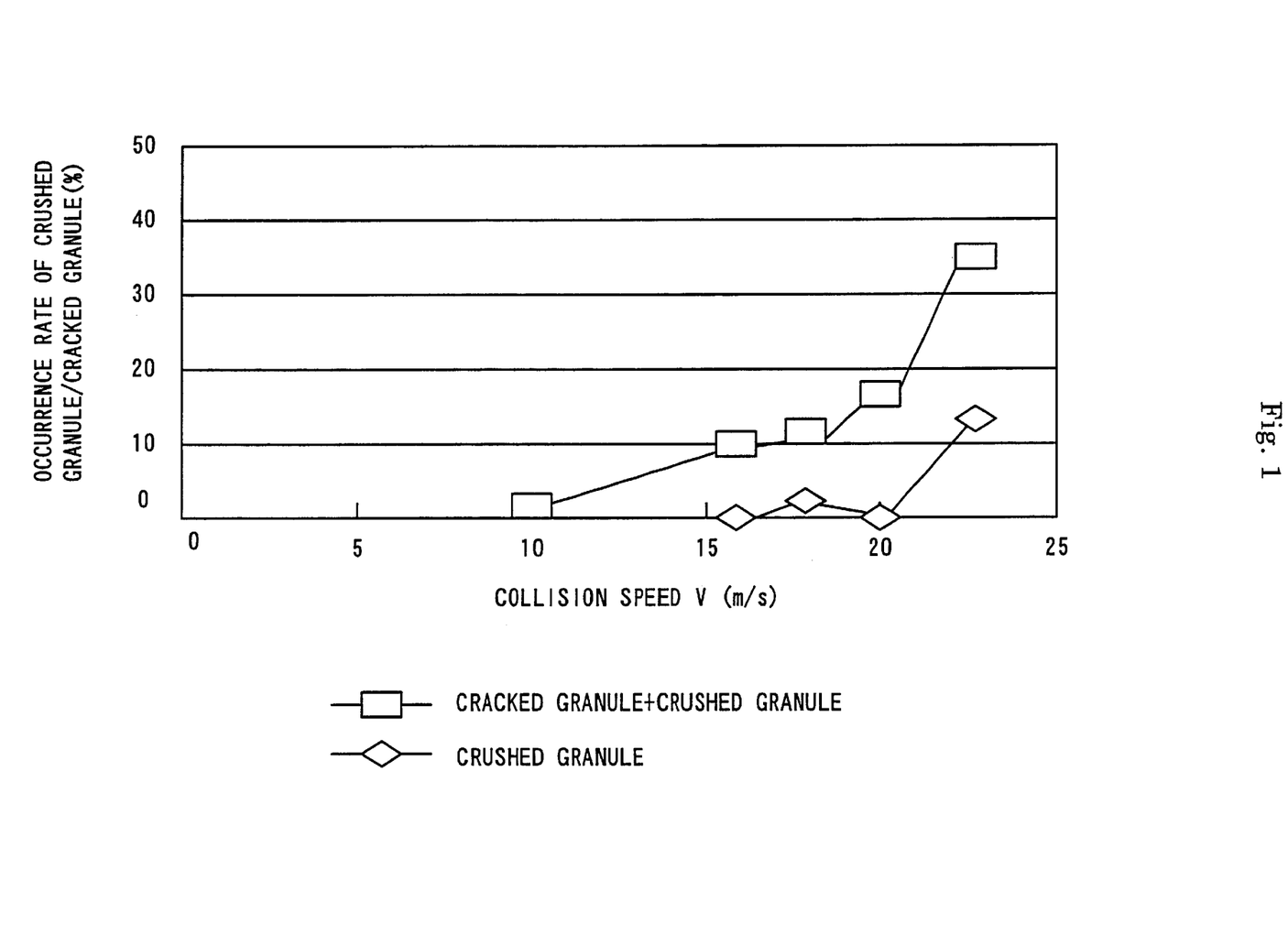
FIG. 1 is a graph showing correlation of a collision speed with an occurrence rate of crushed granules and of cracked plus crushed granules of polished rice when the polished rice is collided with a wall surface at a right angle.
Figure 2:
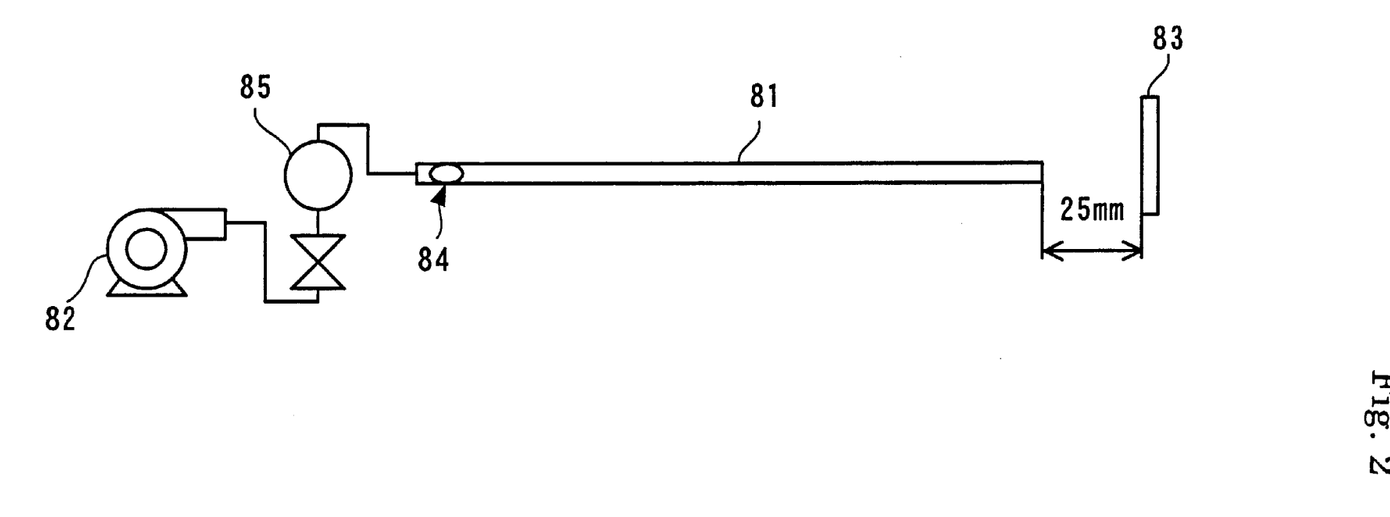
FIG. 2 is an explanatory view of a device used for the experiment in FIG. 1.

Next, findings obtained by the inventors of the present invention are explained. As a result of various studies on correlation of a collision speed of polished rice with its crushing rate and cracking rate, the inventors of the present invention have found that a velocity V of transportation gas needs to be in a range from 10 m/s to 20 m/s. FIG. 1 is a graph showing correlation between a collision speed and rates of occurrence of crushed granules of polished rice and of occurrence of cracked plus crushed granules of polished rice. Here, the crushed granules of polished rice mean polished rice which is crushed to be broken into pieces and therefore, is difficult to be used as boiled rice and can be used only for materials for confectionary, rice crackers, or the like. The cracked granules mean polished rice which only has cracks therein and can be used as boiled rice. This experiment was conducted, using a device in which a blower 82 is disposed at one end of an acryl pipe 81 having length of 1000 mm and a stainless plate 83 is disposed vertically in a position 25 mm away from an exit at the other end of the acryl pipe 81, as shown in FIG. 2. Damage condition of polished rice 84 was examined after the polished rice 84 was put at an end part on a blower 82 side inside the acryl pipe 81 as shown in FIG. 2 and was pneumatically transported by the blower 82 to be collided with the stainless plate 83 at a collision angle of 90 degrees.

It is apparent from FIG. 1 that the occurrence rate of crushed granules or cracked and crushed granules of the polished rice suddenly increases when the collision speed exceeds 20 m/s. Therefore, the velocity V of the transportation air needs to be set at a value equal to 20 m/s or less. Meanwhile, in order to secure an amount of transported rice in pneumatic transportation, the velocity V of the transportation air needs to be set at a value equal to 10 m/s or more. Based on the above findings, it has been found that the velocity V of the transportation air needs to be set at a value in a range of $10 \text{ m/s} \leq V \leq 20 \text{ m/s}$.

Figure 3:
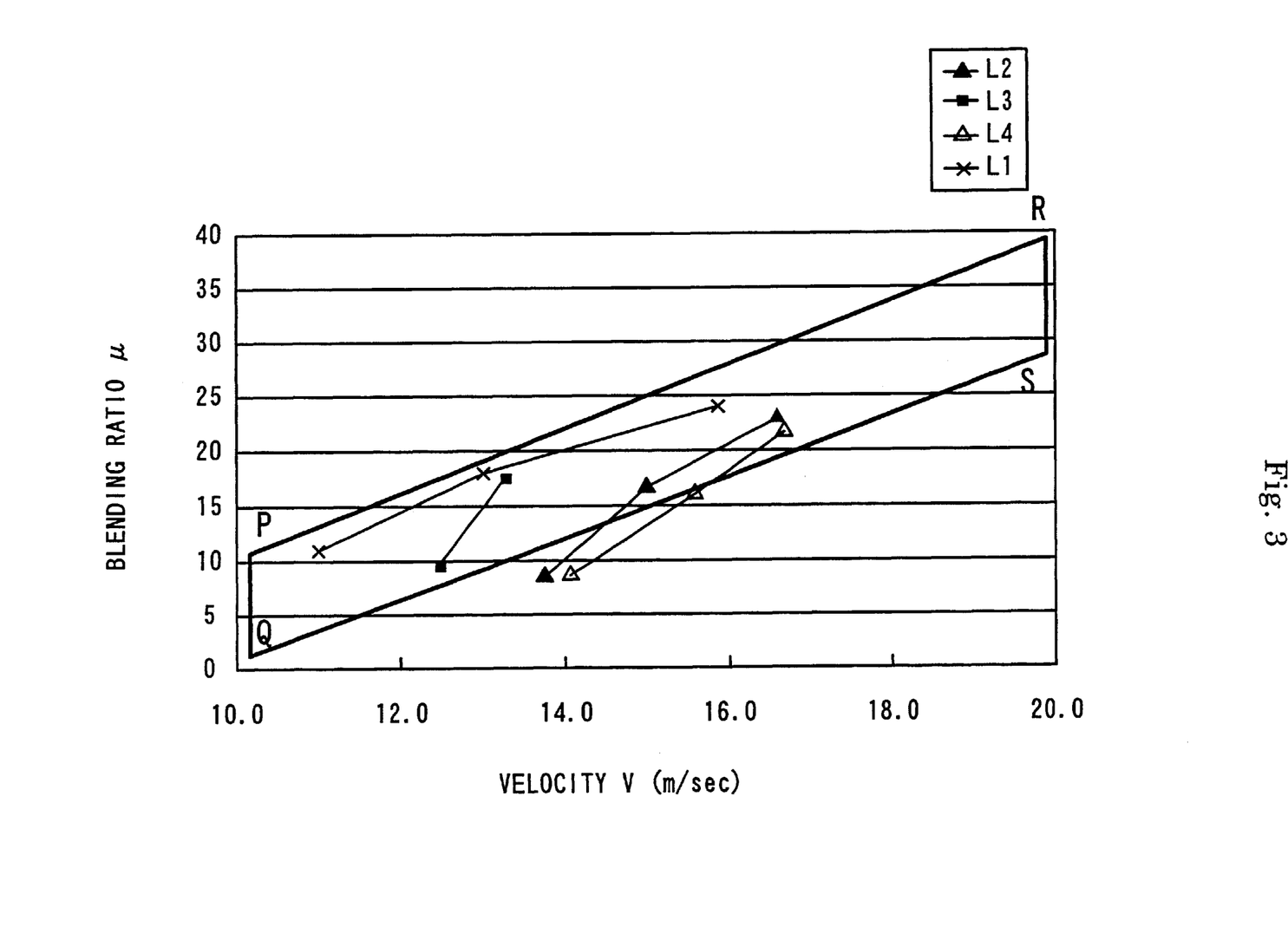
FIG. 3 is a graph showing correlation between a velocity of transportation air and a blending ratio in pneumatic transportation of polished rice.

The inventors of the present invention have also found it appropriate that a blending ratio $\mu$ which is expressed by a ratio of a flow amount of the polished rice (Kg/H) to a flow amount of the transportation air (Kg/H) is set at a value within the following range. Namely, the inventors of the present invention have obtained the result, after studying correlation between the velocity V (m/s) of the transportation air and the blending ratio $\mu$, that appropriately, the blending ratio is within the range between the line P-R and the line Q-S in FIG. 3. In FIG. 3, L1, L2, L3, and L4 show results in cases where the length of the transportation pipe is 15 m, 50 m, 75 m, and 100 m respectively. A favorable result has been obtained that the polished rice can be transported without any crushed granules occurring therein in this range while an unfavorable result has been obtained that the occurrence rate of the crushed granules increases outside this range. Based on these results, it has been found appropriate that the blending ratio $\mu$ is in a range of $(3\ V-30) \leq \mu \leq (3\ V-20)$.

The inventors of the present invention have also confirmed in the experiment that the inside of the pipe is clogged when $\mu$ exceeds 10 under the condition that the velocity V of the transportation air is approximately 10 m/s, which does not allow pneumatic transportation to be performed. It has also been confirmed in the experiment that, when $\mu$ is 10 or less, since the inside of the pipe approximates to vacancy, the pipe is not clogged, which allows the rice to be sent smoothly, but since an amount of transported rice is small, the rice easily collides, and, under the condition of a high velocity of the transportation air, it easily crushes. Meanwhile, as the velocity V approaches 20 m/s, which results in an increased amount of the transportation air, even more amount of the rice can be transported and crushing is reduced owing to self-cushion among the rice. However, there is a limit that crushing increases drastically when the velocity V exceeds 20 m/s as described above.

Based on the above findings, the inventors of the present invention have found it appropriate that the blending ratio $\mu$ is within the range surrounded by the substantial parallelogram P, Q, R, S shown in FIG. 3.

The inventors of the present invention have also obtained correlation of a difference in temperature between polished rice and transportation air with damage to the polished rice under the condition that the velocity V of the transportation air is fixed (V=20 m/s), using the experiment device shown in FIG. 2. In this experiment, the polished rice 84 is put and kept unmoved in the air whose temperature is 20° C. and whose humidity is 70%, and thereafter, the polished rice 84 whose temperature has reached 20° C. is put at one end on the blower 82 side of the acryl pipe 81, while an air stream generated by the blower 82 is supplied with its temperature adjusted by a heater 85 to vary its difference in temperature from that of the polished rice 84. Similarly to the aforesaid experiment, the damage condition of the polished rice 84 was examined after the polished rice 84 was pneumatically transported by the blower 82 to be collided with the stainless plate 83 at the collision angle of 90 degrees.

Figure 4:
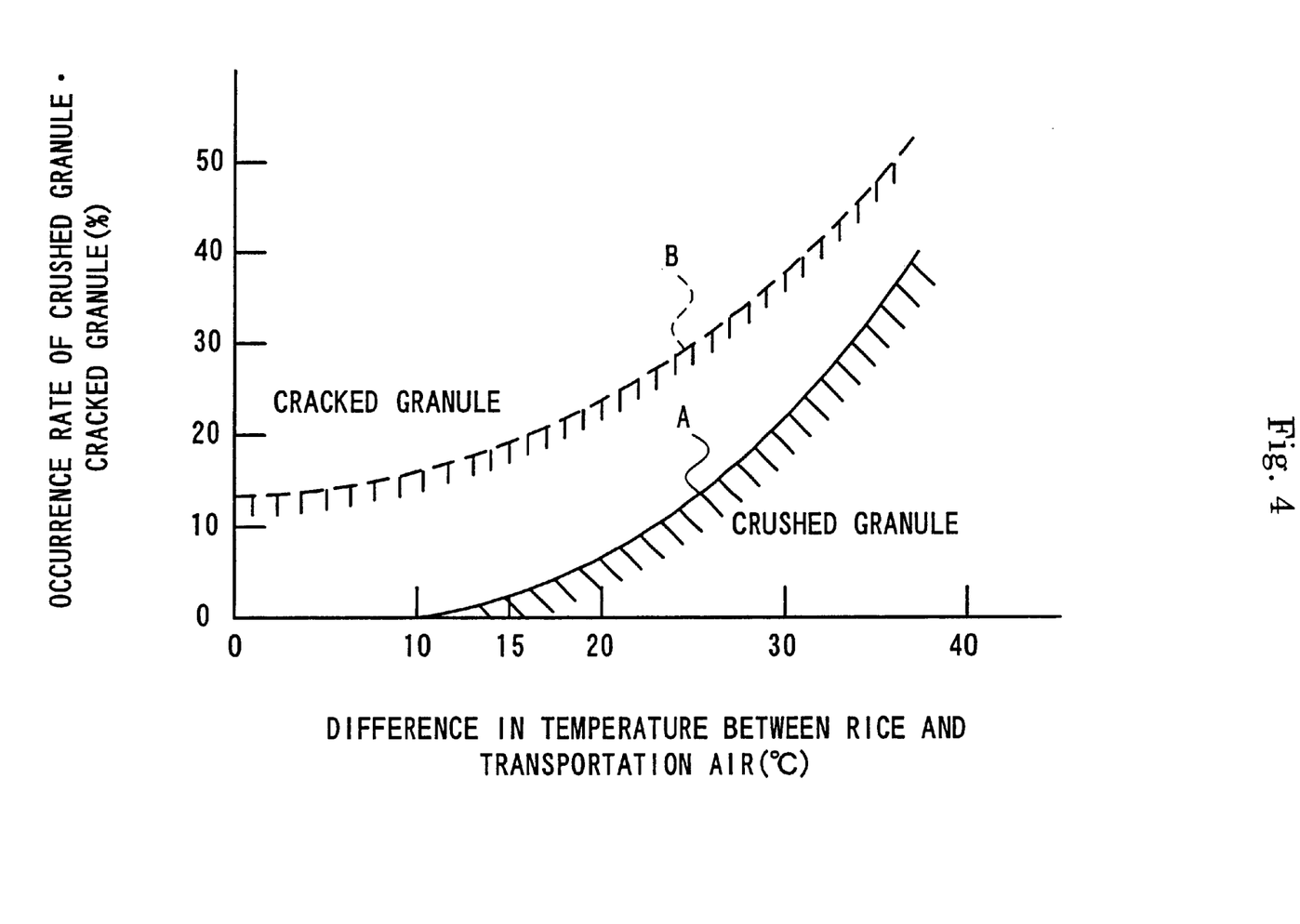
FIG. 4 is a graph showing correlation of a difference in temperature between the polished rice and the transportation air with the occurrence rate of the crushed granules and the cracked granules of the polished rice.

The result of the experiment is shown in FIG. 4. In FIG. 4, the horizontal axis shows a difference in temperature (° C.) between the polished rice and the transportation air and the vertical axis shows an occurrence rate of crushed granules and an occurrence rate of cracked granules of the polished rice. The occurrence rate of crushed granules is shown by the solid line A and the occurrence rate of cracked granules is shown by the broken line B.

It is apparent from FIG. 4 that a crushing rate of the polished rice varies depending on the temperature difference between the polished rice and the transportation air. For example, the result of the experiment in FIG. 1 shows that the crushing rate of the polished rice is approximately 15% under the condition of the velocity of V=20 m/s, but the result of the experiment in FIG. 4 shows that the crushing rate of the polished rice increases to approximately 22% or more under the condition that the temperature difference between the polished rice and the transportation air is 20° C. or more.

The inventors of the present invention have found from the experiment result shown in FIG. 4 that crushed granules do not occur when the temperature difference between the polished rice and the transportation air is 10° C. or less. Therefore, when the polished rice is transported by transportation air flowing through transportation pipes which are connected with tanks for accommodating the polished rice therein, it is appropriate that the transportation air whose temperature difference from that of the polished rice flowing into the tanks or the polished rice flowing out of the tanks is 10° C. or less is supplied into the transportation pipes to transport the polished rice. Basically, it is appropriate that the temperature of the transportation air is equal to the temperature of the polished rice, but it has been found that in an actual apparatus, the temperature difference of the transportation air from that of the polished rice may be within a range of ±15° C. and more appropriately, within a range of ±10° C.

The present invention, which is made based on the above findings, is a gas transportation method for grain having Vickers hardness Hv in a range of $11 \leq Hv \leq 14$, and is characterized in that a velocity V of transportation gas is adjusted to be in a range of 10 m/s $\leq V \leq$ 20 m/s.

The present invention is also a gas transportation method for grain having Vickers hardness Hv in a range of $11 \leq Hv \leq 14$, and is characterized in that a blending ratio $\mu$ expressed as a ratio of a flow amount of the grain (kg/H) to a flow amount of transportation gas (kg/H) is set in a range of $(3\ V-30) \leq \mu \leq (3\ V-20)$.

It is also a gas transportation method for grain having Vickers hardness Hv in a range of $11 \leq Hv \leq 14$, and is characterized in that a velocity V of transportation gas is set to be in a range of 10 m/s $\leq V \leq$ 20 m/s and a blending ratio $\mu$ expressed as a ratio of a flow amount of the grain (kg/H) to a flow amount of the transportation gas (kg/H) is set to be in a range of $(3\ V-30) \leq \mu \leq (3\ V-20)$.

Furthermore, it is appropriate that the temperature of the transportation gas is controlled so that a difference between the temperature of the transportation gas and the temperature of the grain is within a predetermined range.

It is appropriate here that the difference between the temperature of the transportation gas and the temperature of the grain is 15° C. or less.

It is also appropriate that the humidity of the transportation gas is controlled to be at a value substantially equal to equilibrium temperature of the grain.

DETAILED DESCRIPTION OF THE PREFERRED EMBODIMENT

A preferred embodiment of a gas transportation method for grain according to the present invention is explained in detail below with reference to the drawings.

Figure 5:
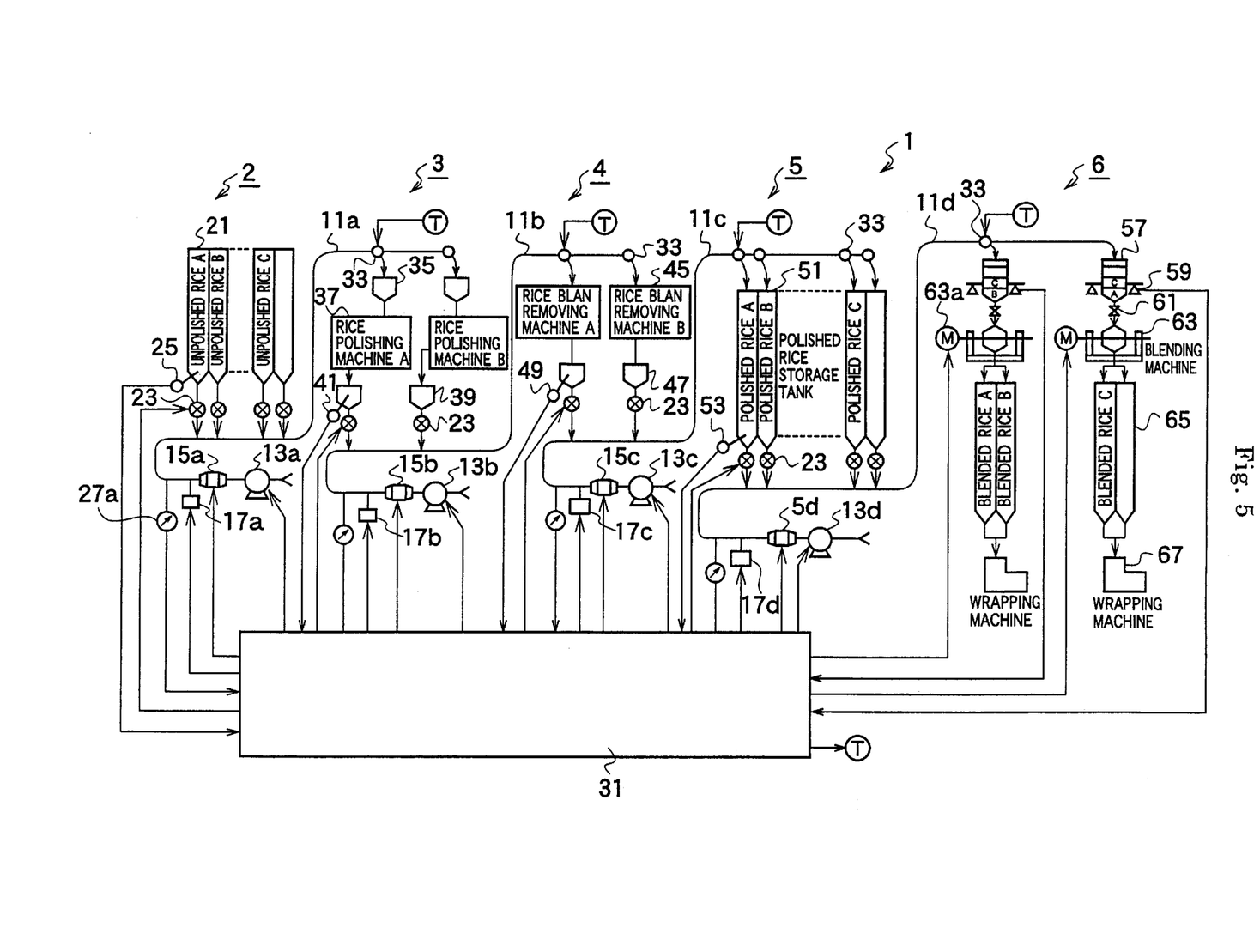
FIG. 5 is an explanatory block diagram of a transportation apparatus for rice showing one embodiment of the present invention; according to the present invention.

FIG. 5, showing one embodiment of the gas transportation method for grain according to the present invention, is an explanatory block diagram of an apparatus in a case where the present invention is applied to pneumatic transportation of rice.

FIG. 5, a transportation apparatus 1 for rice has a structure in which four stages of transportation pipes 11 through which pneumatic transportation is performed are connected in series. The transportation apparatus 1 is composed of an unpolished rice storage section 2 for storing unpolished rice therein, a rice polishing section 3 for polishing the unpolished rice to make half-polished rice, a rice bran removing section 4 for removing rice bran from the half-polished rice to make polished rice, a polished rice storage section 5 for storing the polished rice therein, and a blending section 6 for blending various kinds of polished rice stored in the polished rice storage section 5.

The transportation pipes 11 are composed of a first transportation pipe 11a for connecting the unpolished rice storage section 2 with the rice polishing section 3, a second transportation pipe 11b for connecting the rice polishing section 3 with the rice bran removing section 4, a third transportation pipe 11c for connecting the rice bran removing section 4 with the polished rice storage section 5, and a fourth transportation pipe 11d for connecting the polished rice storage section 5 with the blending section 6. It is necessary that curvature of passages of these transportation pipes 11 is set at a value at least equal to 500 mmR or more (more appropriately, about 1000 mmR) to prevent rice from colliding with inner walls of the pipes at an acute angle.

The transportation pipes 11 are provided at respective starting ends thereof with blowers 13 for sending an air stream and intercoolers 15 which are disposed inside the pipes on downstream sides of the blowers 13, for heating or cooling transportation air according to the temperature of the rice to adjust the temperature of the transportation air. By putting the blowers 13 and the intercoolers 15 into operation, the air whose temperature is adjusted at a value appropriate for the rice moving toward terminal ends of the transportation pipes 11 is sent into the transportation pipes 11. Moreover, humidifying/dehumidifying devices 17 are provided on downstream sides of the intercoolers 15 to adjust the humidity of the transportation air to be equal to equilibrium humidity of the rice. Here, the equilibrium humidity of the rice, which means the humidity at which rice does not absorb or discharge moisture, is approximately 70%.

Each of the transportation pipes 11a, 11b, 11c, and 11d is explained as follows. In the first transportation pipe 11a, a first blower 13a, a first intercooler 15a, and a first humidifying/dehumidifying device 17a are disposed; in the second transportation pipe 11b, a second blower 13b, a second intercooler 15b, and a second humidifying/dehumidifying device 17b are disposed; in a third transportation pipe 11c, a third blower 13c, a third intercooler 15c, and a third humidifying/dehumidifying device 17c are disposed; and in a fourth transportation pipe 11d, a fourth blower 13d, a fourth intercooler 15d, and a fourth humidifying/dehumidifying device 17d are disposed.

The unpolished rice storage section 2 is provided with a plurality of first storage tanks 21 for storing unpolished rice therein, and the first storage tanks 21 are connected with the first transportation pipe 11a at parts on a downstream side of the first blower 13a, the first intercooler 15a, and the humidifying/dehumidifying device 17a via respective rotary feeders 23. When the transportation air is supplied to the first transportation pipe 11a by the first blower 13a, the unpolished rice discharged from the first storage tanks 21 by the respective rotary feeders 23 is transported toward the rice polishing section 3 which is disposed at a terminal end of the first transportation pipe 11a.

Figure 6:
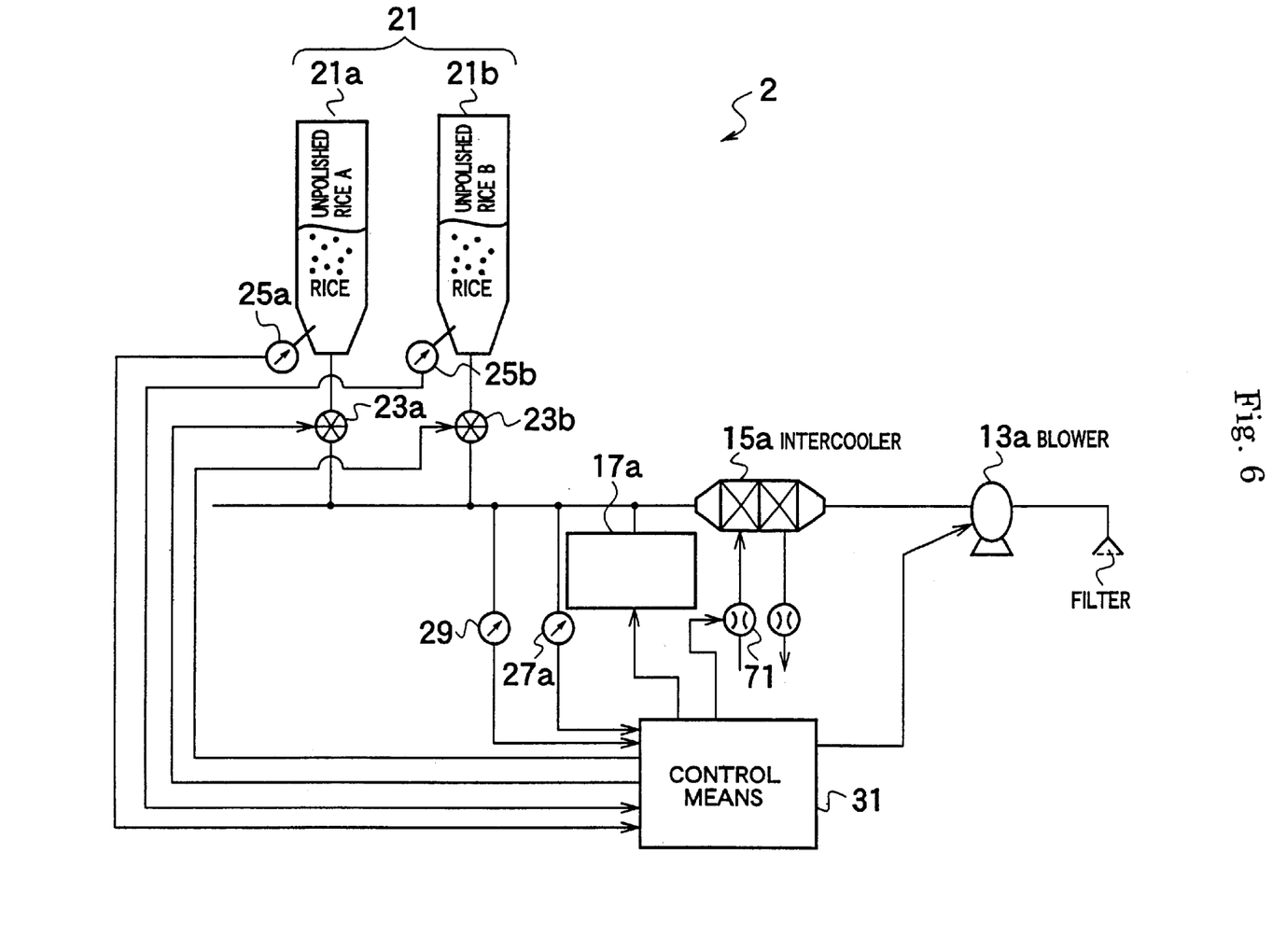
FIG. 6 is a fragmentary enlarged view of the transportation apparatus for rice in FIG. 5.

All of first storage tanks 21A, 21B, 21C . . . , and so on are provided with unpolished rice temperature sensors 25 for measuring respective temperatures of stored unpolished rice A, B, C . . . , and so on, and temperature signals indicating the temperatures measured by the unpolished rice temperature sensors 25 are transmitted to control means 31. The control means 31 stores the temperatures of the first intercooler 15a corresponding to the temperatures of the unpolished rice measured by the unpolished rice temperature sensors 25 and controls a difference in temperature between the unpolished rice and the transportation air to be within a predetermined range. Alternatively, feed back control is also appropriate in which a temperature sensor 29 (shown in FIG. 6) for measuring the temperature of the air is provided inside the first transportation pipe 11a on a downstream side of the first intercooler 15a and the humidifying/dehumidifying device 17a as shown in FIG. 6, and the control means 31 receives a temperature signal indicating the measured temperature to adjust the temperature of the first intercooler 15a. Furthermore, a humidity sensor 27a for measuring the humidity of the transportation air from the first intercooler 15a is also provided in the first transportation pipe 11a, and a humidity signal indicating the humidity measured by the humidity sensor 27a is transmitted to the control means 31. Based on this humidity signal, the control means 31 outputs an instruction to the humidifying/dehumidifying device 17a so that the humidity of the transportation air is adjusted to be equal to the equilibrium humidity (approximately 70%) of the rice, for example, by generation of vapor, and the control means 31 causes the transportation air to be supplied to the first transportation pipe 11a.

The rice polishing section 3 is provided with a plurality of branch valves 33 which are disposed in series in the first transportation pipe 11a, for sending the unpolished rice which is transported thereto to either one of branching-off passages. By an appropriate changeover operation of the branch valve 33 designated by an instruction from the control means 31, the unpolished rice which has passed through either one of the branching-off passages is sent to a corresponding rice polishing machine 37 via a corresponding first accommodation tank 35 to be processed into half-polished rice. Incidentally, the structure in which the changeover operation is performed at a branching angle of 30° or less so as not to have branching lines make sharp curves at the branch valves 33 prevents the unpolished rice from crushing due to collision. Under the rice polishing machines 37, a plurality of second accommodation tanks 39 for storing half-polished rice and storing various kinds of half-polished rice to be supplied to a starting end side of the second transportation pipe 11b are disposed.

The plural second accommodation tanks 39 are connected with the second transportation pipe 11b at parts on a downstream side of the second blower 13b and the second intercooler 15b via respective rotary feeders 23. Supplying the transportation air to the second transportation pipe 11b by the second blower 13b causes the half-polished rice which is discharged from the second accommodation tanks 39 by the respective rotary feeders 23 to be transported to the rice bran removing section 4 which is disposed at a terminal end of the second transportation pipe 11b. In the second accommodation tanks 39, half-polished rice temperature sensors 41 for measuring the temperatures of the stored half-polished rice is provided and temperature signals indicating the temperatures measured by the half-polished rice temperature sensors 41 are transmitted to the control means 31. Furthermore, a humidity sensor 27b for measuring the humidity of the transportation air from the second intercooler 15b is provided in the second transportation pipe 11b and a humidity signal indicating the humidity measured by the humidity sensor 27b is transmitted to the control means 31. The control means 31 receives the temperature signals and the humidity signal to perform control operation in the same manner as previously described.

The rice bran removing section 4 is provided with a plurality of branch valves 33 which are connected in series in the second transportation pipe 11b, for sending the half-polished rice which is transported thereto to either one of branching-off passages. By the changeover operation of the branch valve 33 designated by an instruction from the control means 31, the half-polished rice which has passed through either one of the branching-off passages is sent to a corresponding rice bran removing machine 45 to be processed into polished rice with its rice bran removed. Under the rice bran removing machines 45, a plurality of third accommodation tanks 47 for storing the polished rice from which rice bran has been removed and storing various kinds of polished rice to be supplied to a starting end side of the third transportation pipe 11c are disposed.

The plural third accommodation tanks 47 are connected with the third transportation pipe 11c at parts on a downstream side of the third blower 13c and the third intercooler 15c via respective rotary feeders 23. Supplying the transportation air to the third transportation pipe 11c by the third blower 13c causes the polished rice which is discharged from the third accommodation tanks 47 by the respective rotary feeders 23 to be transported to the polished rice storage section 5 which is disposed at a terminal end of the third transportation pipe 11c. In the third accommodation tanks 47, polished rice temperature sensors 49 for measuring the temperatures of the stored polished rice is provided and temperature signals indicating the temperatures measured by the polished rice temperature sensors 49 are transmitted to the control means 31. Furthermore, a humidity sensor 27c for measuring the humidity of the transportation air from the third intercooler 15c is provided in the third transportation pipe 11c and a humidity signal indicating the humidity measured by the humidity sensor 27c is transmitted to the control means 31. The control means 31 receives the temperature signals and the humidity signal to perform control operation in the same manner as previously described.

The polished rice storage section 5 is provided with a plurality of branch valves 33 which are disposed in series in the third transportation pipe 11c, for sending the polished rice which is transported thereto to either one of branching-off passages. By the changeover operation of the branch valve 33 designated by an instruction from the control means 31, the polished rice which has passed through either one of the branching-off passages is stored in a predetermined polished rice storage tank 51.

The plural polished rice storage tanks 51 are connected with the fourth transportation pipe 11d at parts on a downstream side of the fourth blower 13d and the fourth intercooler 15d via respective rotary feeders 23. Supplying the transportation air to the fourth transportation pipe 11d by the fourth blower 13d causes the polished rice which is discharged from the polished rice storage tanks 51 by the respective rotary feeders 23 to be transported toward the blending section 6 which is disposed at a terminal end of the fourth transportation pipe 11d. In the polished rice storage tanks 51, stored polished rice temperature sensors 53 for measuring the temperatures of the stored polished rice is provided and temperature signals indicating the temperatures measured by the stored polished rice temperature sensors 53 are transmitted to the control means 31. Furthermore, a humidity sensor 27d for measuring the humidity of the transportation air from the fourth intercooler 15d is provided in the fourth transportation pipe 11d and a humidity signal indicating the humidity measured by the humidity sensor 27d is transmitted to the control means 31. The control means 31 receives the temperature signals and the humidity signal to perform control operation in the same manner as described above.

The blending section 6 is provided with a plurality of branch valves 33 which are disposed in series in the fourth transportation pipe 11d, for sending the stored polished rice which is transported thereto to either one of the branching-off passages. By the changeover operation of the branch valve 33 designated by an instruction from the control means 31, the stored polished rice which has passed through the branching-off passage is accommodated in a corresponding measuring tank 57. The measuring tanks 57 are provided with load sensors 59 attached thereto, which measure the weights of kinds of polished rice A, B, C . . . , and so on which are transported via the fourth transportation pipe 11d and the branch valves 33 to transmit the measured weights to the control means 31. When set specific amounts of various kinds of the polished rice A, B, C . . . , and so on are transported to and accommodated in the measuring tanks 57, valves 61 are opened to send the polished rice to blending machines 63. The blending machines 63 are driven by motors 63a according to instructions from the control means 31 to be rotated and blend various kinds of the polished rice A, B, C, . . . , and so on to make blended rice. The blended rice is wrapped by wrapping machines 67 and shipped after being accommodated in blended rice accommodation tanks 65.

Incidentally, the control means 31 is connected with not-shown driving devices for driving the first blower 13a, the second blower 13b, the third blower 13c, and the fourth blower 13d to control the respective blowers to start driving and stop driving. Furthermore, the control means 31 is connected with not-shown operating devices for operating the rotary feeders 23 and the branch valves 33 to control their starting and stopping operations and outputs instructions to these devices that the rice such as the unpolished rice, the half-polished rice, and the polished rice should be supplied to a predetermined one of the storage tanks, accommodation tanks, rice bran removing machines 45, measuring tanks 57, and so on from the pipes. The order of operations of the blowers 13, the intercoolers 15, the rotary feeders 23, the branch valves 33, the rice polishing machines 37, the rice bran removing machines 45, the blending machines 63, and so on is determined by inputs to the control means 31 according to a required kind of blended rice, a required amount of rice, a shipment situation, and so on. The above-mentioned rotary feeders 13 are discharge devices which have space partitioned by blades arranged at equal spaced intervals on the circumferences thereof and are driven by not shown electric motors, and they are structured to discharge predetermined amounts of rice by their rotation. The branch valves 33 are disposed in series, among which only the branch valve 33 receiving an instruction signal from the control means 31 is changed over at the time of operation to transport the rice from the transportation pipes in a branching-off manner.

In this embodiment, unpolished rice is pneumatically transported from the unpolished rice storage section 2 for storing unpolished rice therein to the rice polishing section 3 which is disposed on a subsequent stage, for polishing unpolished rice, and half-polished rice is pneumatically transported from the rice polishing section 3 to the rice bran removing section 4 for removing rice bran to make polished rice, and furthermore, polished rice is pneumatically transported from the rice bran removing section 4 to the polished rice storage section 5 for storing polished rice therein. This pneumatic transportation is performed by each of the blowers 13 and each of the rotary feeders 23 in each of the processing sections as described above, and they are controlled by the control means 31.

The velocity V of the transportation air generated by the blowers 13 and the blending ratio $\mu$ are controlled by the control means 31 and are controlled to be at the following values as described above. Namely, the velocity V of the transportation air supplied from each of the blowers 13a, 13b, 13c, and 13d is controlled to be within the following range:
[Numerical formula 1]

$$10 \text{ m/s} \leq V \leq 20 \text{ m/s}$$

Furthermore, the blending ratio $\mu$ expressed as the ratio of the flow amount of the rice (kg/H) to the flow amount of the transportation air (kg/H) is controlled to be in the following range.
[Numerical formula 2]

$$(3V-30) \leq \mu \leq (3V-20)$$

The blending ratio $\mu$ is defined as follows.
[Numerical formula 3]

$\mu$=a flow amount of rice (g/H)/a flow amount of air (kg/H)

Showing specific values for the above by a graph as the blending ratio $\mu$ relative to the velocity V (m/s) of the transportation air, the result shown in FIG. 3 is obtained as previously described. The range surrounded by the substantial parallelogram P, Q, R, S including the lines at the lower limit value 10 m/s and the upper limit value 20 m/s of the velocity of the transportation air is a range where crushing and cracking of the rice do not occur. More specifically, when $\mu$ exceeds 10 under the condition that V (m/s) is approximately 10 m/s, the inside of the pipes is clogged, which does not allow gas transportation, and therefore, the flow amount of the rice cannot be increased. When $\mu$ is less than 10, the pipes are not clogged to allow the rice to be sent smoothly, but since the flow amount of the rice is small, the problem that collision easily occurs and the rice easily crushes is caused. Moreover, since transportation efficiency is low, this condition cannot be applied. As V approaches 20 m/s, which results in an increased amount of the air, even more amount of the grain is allowed to be transported. Even when the inside of the pipes are filled with a large amount of the grain, transportation can be performed, and the occurrence rate of crushing is low even at a high velocity owing to self-cushion among the grain. However, when the velocity V exceeds 20 m/s, the occurrence rate of crushing drastically increases, and therefore, the maximum value for $\mu$ is 40.

The control means 31 is connected with the first intercooler 15a, the second intercooler 15b, the third intercooler 15c, and the fourth intercooler 15d as shown in FIG. 5 and it outputs instructions to the intercoolers 15 so that differences between the rice temperatures received from the rice temperature sensors and the transportation air temperature are controlled to be within a predetermined range. In order to cool gas warmed in the blowers 13, the intercoolers 15 generally output instructions to coolant valves 71 for controlling coolant to control the temperature of the transportation air. More specifically, the control means 31 stores the temperatures of the rice and the temperature of the transportation air whose temperature difference from the rice temperature is within a range of ±15° C. and controls the intercoolers 15 so that the difference in temperature between the rice and the transportation air is within the range of ±15° C. More appropriately, the difference in temperature is controlled to be within a range of ±10° C. This temperature control and the control of the velocity and the blending ratio can realize more efficient pneumatic transportation of rice.

The control means 31 is also connected with the humidifying/dehumidifying devices 17a, 17b, 17c, and 17d and outputs instructions to the humidifying/dehumidifying devices 17a, 17b, 17c, and 17d so that the humidity of the transportation air is controlled to be equal to the equilibrium humidity of the rice. At this time, the control means 31 stores the value of the humidity of the transportation air as approximately 70% which is the equilibrium humidity of the rice and controls the humidifying/dehumidifying devices 17a, 17b, 17c, and 17d so that the humidity of the transportation air is adjusted to be approximately 70% which is the equilibrium humidity of the rice after receiving the humidity signals of the transportation air from the humidity sensors 27a, 27b, 27c, and 27d.

Next, the procedure for supplying rice using the transportation apparatus 1 as structured above is explained.

First, the temperature of designated unpolished rice (for example, rice A) stored in the first storage tank 21 is measured by the corresponding unpolished rice temperature sensor 25 and a temperature signal indicating the measured temperature is transmitted to the control means 31. The control means 31 determines the temperature of the transportation air according to the measured temperature of the unpolished rice, based on the result shown in FIG. 4, outputs an instruction to adjust the air flowing in the first intercooler 15a to be at the determined temperature, and puts the coolant valve 71 of the first intercooler 15a into operation. At this time, the control means 31 also outputs an instruction to the driving source for driving the first blower 13a so that the transportation air whose velocity V is in the range of 10 to 20 m/s is generated. The transportation air flowing in the first intercooler 15a is adjusted to be at the determined temperature and is supplied to the first transportation pipe 11a. Furthermore, the humidity of the transportation air is measured by the humidity sensor 27a and a humidity signal indicating the measured humidity is transmitted to the control means 31. The control means 31 outputs the instruction to the humidifying/dehumidifying device 17a so that the humidity of the transportation air is controlled to be equal to the equilibrium humidity (approximately 70%) of the rice, for example, by generation of vapor, and causes the transportation air to be supplied to the first transportation pipe 11a.

When the transportation air flowing in the first transportation pipe 11a is kept at the determined velocity, temperature, and humidity, the control means 31 puts the rotary feeder 23a of the designated first storage tank 21a into operation and causes the unpolished rice A to be supplied to the first transportation pipe 11a. The rotary feeder 23a is controlled so that this supply amount is within the range shown in FIG. 3. This control can be performed by setting the supply amount at a value on the centerline in the parallelogram. More specifically, in FIG. 3, the blending ratio μ is controlled to be approximately 15, for example, when the velocity of the transportation air is set at 14 m/s. The unpolished rice A supplied to the first transportation pipe 11a is transported by the transportation air through the first transportation pipe 11a to flow into the rice polishing section 3. Thereby, the unpolished rice transported through the first transportation pipe 11a is transported under the condition that the temperature difference between the rice and the transportation air is within the set temperature range, regardless of variation in the temperature of the rice depending on seasons such as summer or winter and so on. This makes it possible to reduce the occurrence of crushed granules and cracked granules of the rice.

The unpolished rice A flowing into the rice polishing section 3 is accommodated in a predetermined one of the first accommodation tanks 35 from the first transportation pipe 11a by the changeover operation of the branch valve 33 designated by the control means 31. The accommodated unpolished rice A is polished by the corresponding rice polishing machine 37 provided on a downstream side thereof to be processed into half-polished rice. At this time, the temperature of the half-polished rice increases by approximately 20° C. due to the polishing operation by the rice polishing machine 37. The half-polished rice whose temperature has increased is accommodated in the corresponding second accommodation tank 39 which is disposed on a downstream side of the rice polishing machine 37.

When the rice is continued to be conveyed to a downstream process in the rice polishing process, the half-polished rice whose temperature has increased is supplied from the second accommodation tank 39 to the second transportation pipe 11b via the rotary feeder 23 which is operated according to an instruction given by the control means 31. At this time, the velocity V of the transportation air and the blending ratio μ are also determined. Furthermore, the temperature of the half-polished rice in the second accommodation tank 39 is measured by the half-polished rice temperature sensor 41 and a temperature signal indicating the measured temperature is transmitted to the control means 31. The control means 31 determines the temperature of the transportation air according to the measured temperature of the half-polished rice whose temperature has increased so that the temperature difference between the half-polished rice and the transportation air is within the predetermined temperature range, and the control means 31 outputs an instruction that the transportation air flowing in the second intercooler 15b should be adjusted at the determined temperature and puts the second intercooler 15b into operation. Thereby, the rice transported through the second transportation pipe 11b is transported under the condition that the difference in temperature between the transportation air and the rice is within the set temperature range even if its temperature increases by approximately 20° C. after being polished by the rice polishing machine 37, which can reduce the occurrence of crushed granules and cracked granules. Furthermore, the humidity of the transportation air is measured by the humidity sensor 27b and a humidity signal indicating the measured humidity is transmitted to the control means 31. Then, the control means 31 controls the humidifying/dehumidifying device 17b to adjust the humidity of the transportation air. The control means 31 also outputs an instruction to the driving device for driving the second blower 13b to cause the transportation air to be generated. The transportation air flowing in the second intercooler 15b is supplied to the second transportation pipe 11b while being controlled to be at the determined temperature and humidity. Then, the control means 31 puts the rotary feeder 23 of the second accommodation tank 39 into operation and causes the half-polished rice to be discharged to the second transportation pipe 11b. The half-polished rice discharged to the second transportation pipe 11b is transported by the transportation air through the second transportation pipe 11b and transported to the rice bran removing section 4.

In a case where the rice is transported to the subsequent process after it is temporarily accommodated and kept in the second accommodation tank 39, the rice is supplied to the second transportation pipe 11b via the rotary feeder 23 which also operates according to the instruction from the control means 31. At this time, the velocity V of the transportation air and the blending ratio μ are also determined. Furthermore, the temperature of the half-polished rice in the second accommodation tank 39 is measured by the half-polished rice temperature sensor 41 and a temperature signal indicating the measured temperature is transmitted to the control means 31. The control means 31 determines the temperature of the transportation air according to the measured temperature of the half-polished rice whose temperature has increased, outputs an instruction that the air flowing in the second intercooler 15b should be adjusted to be the determined temperature, and puts the second intercooler 15b into operation. The humidity is also controlled by the humidity sensor 27b and the control means 31, and the half-polished rice is sent to the rice bran removing section 4 through the second transportation pipe 1ib.

Thereafter, similar processing is performed up to the process performed by the blending section 6 for polished rice.

As described hitherto, according to the present invention, the occurrence of crushed granules and cracked granules of the rice during transportation can be reduced when the rice is pneumatically transported from the unpolished rice storage tanks to the rice polishing machines, from the rice polishing machines to the rice bran removing machines, from the rice bran removing machines to the polished rice storage tanks, from the polished rice storage tanks to the blended rice accommodation tanks, and so on.

Incidentally, in the above-described embodiment, the case where rice is transported is explained, but the present invention is applicable to gas transportation of other grain such as wheat and corn other than rice. Moreover, the transportation gas is not limited to air, and nitrogen gas, which is filled in the pipes in order to prevent explosion, can also be used for transportation.

As described hitherto, according to the present invention, the occurrence of crushed granules and cracked granules can be reduced when grain is transported by means of gas.

What is claimed is:

1. A gas transportation method for grain having Vickers hardness Hv in a range of $11 \leq Hv \leq 14$, comprising the step of:

adjusting a velocity V of transportation gas to be within a range of 10 m/s $\leq V \leq$ 20 m/s.

2. A gas transportation method for grain having Vickers hardness Hv in a range of $11 \leq Hv \leq 14$, comprising the step of:

setting a blending ratio μ expressed as a ratio of a flow amount of the grain (kg/H) to a flow amount of transportation gas (kg/H) to be within a range of (3 V−30) $\leq \mu \leq$ (3 V−20).

3. A gas transportation method for grain having Vickers hardness Hv in a range of $11 \leq Hv \leq 14$, comprising the steps of:

adjusting a velocity V of transportation gas to be within a range of 10 m/s≦V≦20 m/s; and setting a blending ratio $\mu$ expressed as a ratio of a flow amount of the grain (kg/H) to a flow amount of the transportation gas (kg/H) to be within a range of (3 V−30)≦$\mu$≦(3 V−20).

4. A gas transportation method for grain according claim 1, further comprising the step of:

controlling a difference between temperature of the transportation gas and temperature of the grain to be within a predetermined temperature difference range.

5. A gas transportation method for grain according to claim 4, wherein the difference between the temperature of the transportation gas and the temperature of the grain is 15° C. or less.

6. A gas transportation method according to claim 1, further comprising the step of:

controlling humidity of the transportation gas to be substantially equal to equilibrium humidity of the grain.

7. A gas transportation method for grain according claim 2 further comprising the step of:

controlling a difference between temperature of the transportation gas and temperature of the grain to be within a predetermined temperature difference range.

8. A gas transportation method for grain according claim 3 further comprising the step of:

controlling a difference between temperature of the transportation gas and temperature of the grain to be within a predetermined temperature difference range.

9. A gas transportation method according to claim 2 further comprising the step of:

controlling humidity of the transportation gas to be substantially equal to equilibrium humidity of the grain.

10. A gas transportation method according to claim 3 further comprising the step of controlling controlling humidity of the transportation gas to be substantially equal to equilibrium humidity of the grain.

11. A gas transportation method according to claim 4 further comprising the step of:

controlling humidity of the transportation gas to be substantially equal to equilibrium humidity of the grain.

12. A gas transportation method according to claim 5 further comprising the step of:

controlling humidity of the transportation gas to be substantially equal to equilibrium humidity of the grain.

* * * * *